Oct. 5, 1943.	H. O. HEM	2,331,092
WEIGHING SCALE
Filed July 23, 1940	3 Sheets-Sheet 1
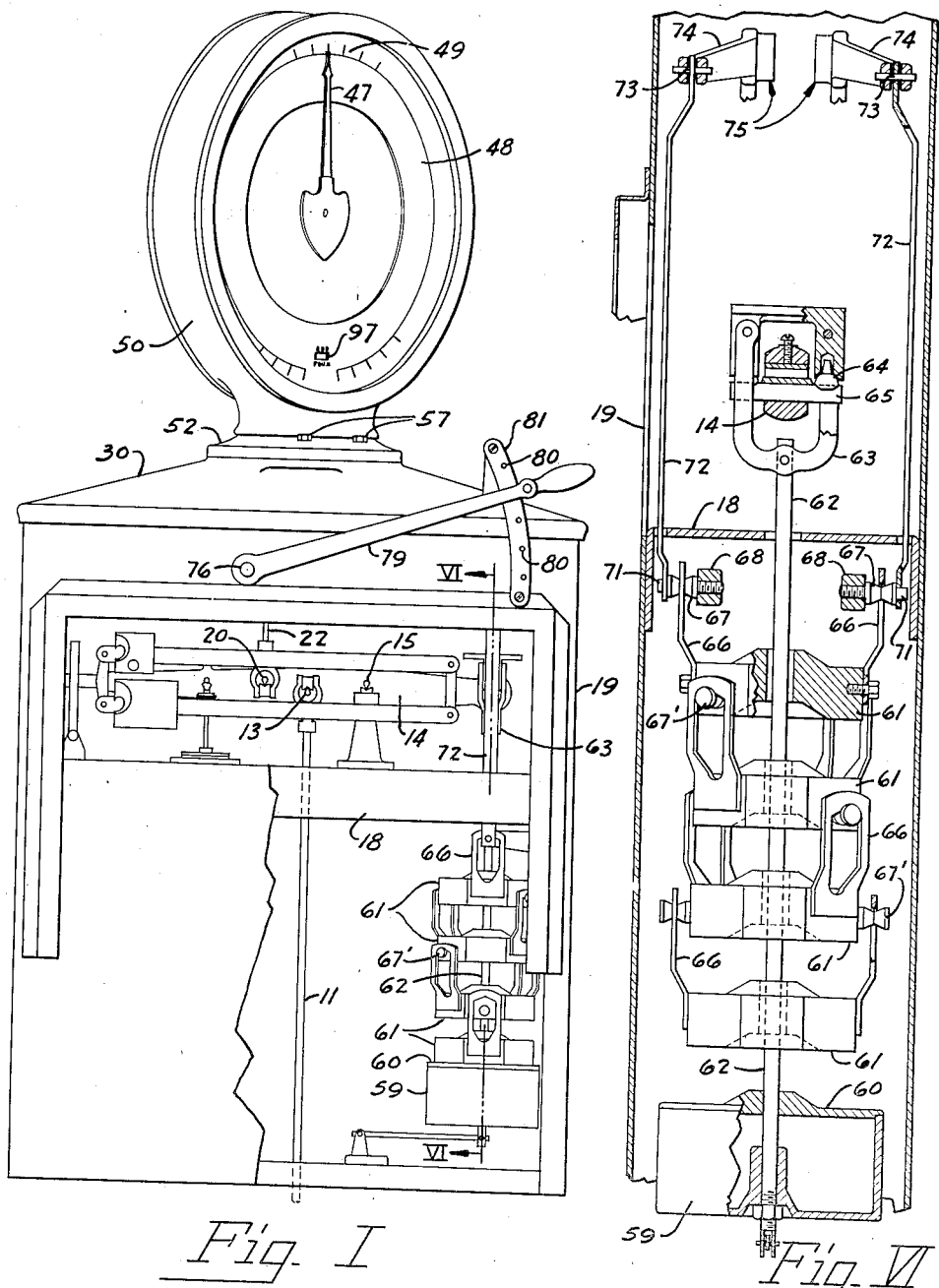
Fig. I
Fig. VI
Halvor O Hem
INVENTOR
BY Marshall & Marshall
ATTORNEYS

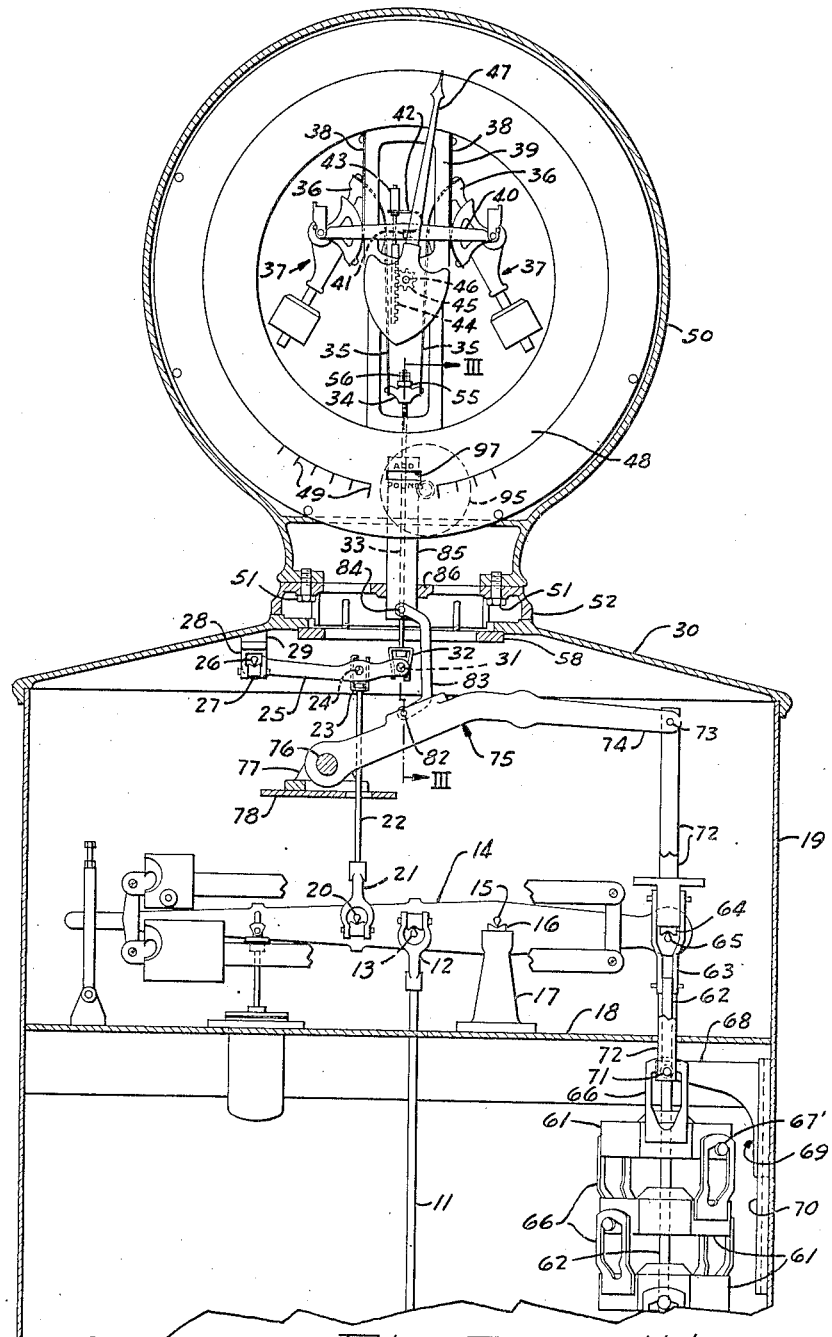
Fig. II
Halvor O. Hem
INVENTOR
BY Marshall & Marshall
ATTORNEYS

Oct. 5, 1943. H. O. HEM 2,331,092
WEIGHING SCALE
Filed July 23, 1940 3 Sheets-Sheet 3
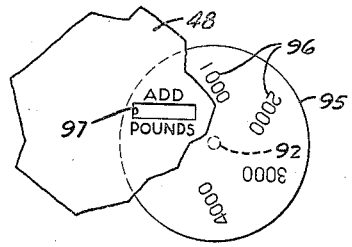
Fig. VII
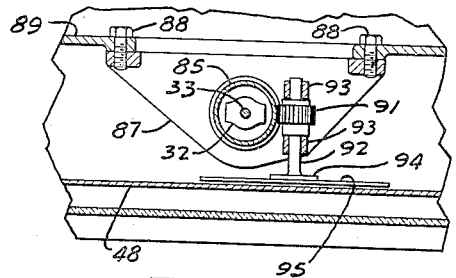
Fig. V
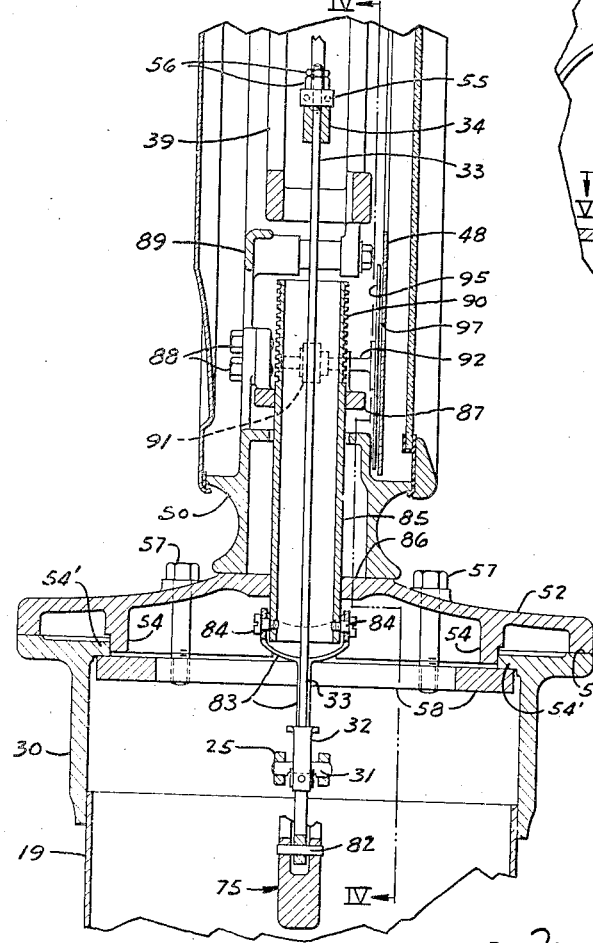
Fig. III
Fig. IV
Halvor O. Hem
INVENTOR
BY Marshall & Marshall
ATTORNEYS Patented Oct. 5, 1943

2,331,092

UNITED STATES PATENT OFFICE 2,331,092

WEIGHING SCALE

Halvor O. Hem, Toledo, Ohio, assignor to Toledo Scale Company, Toledo, Ohio, a corporation of New Jersey Application July 23, 1940, Serial No. 346,908

6 Claims. (Cl. 265—48)

This invention relates to self-indicating weighing scales, and more particularly to weighing scales having auxiliary unit weight mechanism for supplementing the automatic weighing capacity.

In scales of this types the amount of such additional weighing capacity affected by the unit weights must be indicated to the operator to eliminate errors. This is usually accomplished by a movable strip or rotatable disk which is automatically actuated by the means which place or remove the unit weights. These strips or disks have appropriate markings which are visible through an opening in the automatic weight indicating dial.

Since the means for actuating the automatic load counterbalancing means comprises a connecting rod which is positioned on the vertical axis of the dial housing the means for actuating the unit weight indicating disk or "flash" heretofore had to enter the dial housing at a point spaced therefrom. At times, however, it is highly desirable that the dial housing be turned at an angle so that it does not face the platform. This can be readily accomplished by turning the entire housing assembly to the desired angle if a substantially tubular column is used for supporting the dial housing, but when the dial housing is supported on a cabinet of substantial width this is impossible because a portion of this cabinet will then project over the platform of the scale.

The principal object of the present invention is therefore the provision of improved means for connecting the automatic load counterbalancing mechanism to the lever mechanism and the flash operating mechanism to the unit weight actuating means in such a manner that these connections are both located substantially in the vertical axis of the dial housing, whereby only the dial housing may be turned to an angular position.

And another object of the invention is the provision of a tubular rack for actuating the flash actuating means.

These, and other objects and advantages will be apparent from the following description in which reference is had to the accompanying drawings, illustrating a preferred embodiment of the invention and in which similar reference numerals refer to similar parts throughout the several views.

In the drawings:

Fig. I is a front elevational view of the device in which the dial housing is positioned at a substantial angle relative to the face of the cabinet, parts being broken away for clarity.

Fig. II is an enlarged fragmentary front elevational view of the device in which the dial housing is positioned parallelly to the face of the cabinet, the housing members being sectioned.

Fig. III is an enlarged fragmentary view sectioned substantially along the line III—III of Fig. II.

Fig. IV is an enlarged fragmentary view showing particularly the connection to the automatic load counterbalancing means and the means for actuating the unit weight indicator actuating means, sectioned substantially along the line IV—IV of Fig. III.

Fig. V is a fragmentary view sectioned substantially along the line V—V of Fig. IV.

Fig. VI is an enlarged sectional view of the unit weight means sectioned substantially along the line VI—VI of Fig. I; and, Fig. VII is an enlarged fragmentary elevational view showing the unit weight indicating flash.

Referring to the drawings in detail:

The load counterbalancing and load indicating means herein shown and described are adapted to be used with load receiving platform mechanism of any desired type and, therefore, such load receiving mechanism is not shown nor described herein. The moment occasioned by a load placed on such load receiving mechanism is transmitted through a connecting rod 11 which is equipped at its other end with a stirrup 12 to a load pivot 13 in an intermediate lever 14. This stirrup engages the pivot 13. This lever 14, by means of a pivot 15, is rockingly mounted upon suitable V bearings 16 seated in sockets in the upper ends of spaced horns of a fulcrum stand 17 which is mounted upon a shelf 18 in a cabinet 19. A power pivot 20, in the lever 15, engages a suitable bearing in a stirrup 21 on the lower end of a connecting rod 22. The upper end of this rod is provided with a stirrup 23 which engages a load pivot 24 in a pendulum lever 25 fulcrumed by means of a pivot 26 upon suitable bearings 27 in a bracket 28 which is securely fastened to a boss 29 on the underside of the cabinet cover 30 which forms a portion of the cabinet 19.

A nose pivot 31, fixed in the free end of the pendulum lever 25, engages a bearing in a stirrup 32 suspended from the lower end of a connecting rod 33 the upper end of which projects through a bored hole in an equalizer 34 and through a ball bearing 55, of the thrust resisting type, resting on an upper face of the equalizer. A pair of lock nuts 56, locked against each other on the extending portion of the rod 33, maintain it in adjusted vertical position. This ball bearing is provided so that a housing 50 may be readily turned without twisting the connecting rod 33 and cramping or binding the bearing couple comprising the stirrup 32 and the pivot 31 in the pendulum lever 25. The equalizer 34, by means of ribbons 35, is connected to power sectors 36 of load counterbalancing pendulums 37 which, by means of ribbons 38, are suspended from a pendulum frame 39 bolted to suitable means in the interior of the substantially watchcase-shaped dial housing 50. The pendulums are connected to each other by means of a pair of compensating plates 40. Pivotally engaging and extending between these compensating plates is a bar 41 upon which is mounted a substantially C-shaped resilient shock absorbing plate 42 and a rack foot 43. This rack foot supports a rack 44 in a depending position and its teeth mesh with teeth of a pinion 45 keyed to a shaft 46 mounted upon antifriction ball bearings (not shown) which are seated in flanges of the pendulum frame 39.

For the purpose of automatically indicating weights of loads there is fastened to an end of the shaft, which projects forwardly of the pendulum frame 39, an indicator 47 and this indicator cooperates with a chart 48 upon which a series of circularly arranged weight indicia 49 are printed or otherwise marked. This chart is bolted to suitably positioned bosses in the interior of the housing 50 immediately in back of the indicator 47. The chart and indicator cooperate to indicate the weight of that portion of a load which is counterbalanced by the pendulums.

The dial housing 50 is fastened, by means of bolts 51, to a circular cap 52 seated upon a machined track 53 of the cabinet cover 30. To prevent displacement when being rotated this cap is provided with a depending cylindrical rim 54. A portion of this is machined and enters a machined circular aperture in the top of the cabinet cover 30. Portions of this rim however are cut away to clear the bolts 51 which retain the housing 50 to the cap 52. It will be seen that this construction permits the housing 50 to be positioned at any desired angle relative to the load receiver or platform of the scale.

To lock this housing in adjusted position, a plurality of bolts 57, extending through spaced openings in the cap 52, are threaded into a locking ring 58 within the cabinet cover. This locking ring is adapted to be drawn against a flange 54' surrounding the circular opening in the cabinet cover and thus securely clamp the cap 52.

In the device disclosed the unit weight mechanism comprises a weight support 59 which is in the form of a hollow box-like receptacle, which also serves the purpose of receiving shot, lead scraps or similar substance to counterbalance the dead weight of the load receiving means or platform. A cover 60, adapted to support the lowermost of a series of unit weights 61, is provided. The support 59, with its cover 60, is fixed to the lower end of a rod 62 whose upper end is connected to a stirrup 63 in which suitable bearings 64 rest upon a pivot 65 in the intermediate lever 14. This rod extends freely through openings in the series of unit weights 61. The uppermost unit weight 61 is suspended by means of bails 66 from spool-shaped studs 67 threaded into the bifurcated arms 68 of a bracket 69, slidably mounted in suitable ways 70 secured to the side wall of the cabinet 19. The sliding bracket 69 is provided for the purpose of guiding the vertical movement of the series of unit weights 61. This unit weight is also provided with spool-shaped studs 67', suitably positioned, from which the next lower unit weight is suspended by means of its bails 66 as fully disclosed in U. S. Patent No. 1,423,660 to H. O. Hem.

Tenons 71, on the spool-like studs 67, are engaged by the lower ends of connecting members 72 whose upper ends pivotally engage, as at 73, spaced arms 74 of a unit weight operating lever 75. This lever, by means of a shaft 76, is fulcrumed in brackets 77 mounted on a shelf 78 extending between the front and rear wall of the cabinet 19. The operating lever 75 is keyed to the shaft 76. The shaft 76 projects through the front wall of the cabinet and to this projecting end is keyed a unit weight operating handle 79. A spring-urged detent (not shown) in this lever cooperates with a series of holes 80 in a segment 81 suitably fastened to the cabinet 19.

From the aforegoing it will be seen that the series of unit weights 61, the sliding bracket 69, the operating lever 75, as well as the connections 72 and the handle 79, are so related that when the handle 79 is moved from its uppermost position to a position in which the detent engages the second hole the lowermost unit weight 61 will rest on the cover 60 of the weight support 59. This unit weight, since it is now suspended from the intermediate lever 14 on the opposite side of the fulcrum pivot 15 of this lever, exerts a moment in opposition to the moment transmitted through the connecting rod 11 and thus serves to counterbalance a load on the platform of the device. The movement of the unit weight operating handle 79 to the next succeeding hole 80 in the segment 81 places the second unit weight 61 on top of the one now resting on the member 59. The unit weight operating lever may thus sequentially deposit all the unit weights on the unit weight support 59. It is necessary to provide suitable means for indicating the amount counterbalanced by the unit weights 61 when weighing a load which is in excess of the automatic counterbalancing capacity of the device. It is also necessary that this indication be given on the chart or dial so that it may be observed by the operator when reading the amount which is being counterbalanced by the automatically acting load counterbalancing means. To accomplish this, the unit weight operating lever 75, as at 82, pivotally engages a yoke-like link 83. The upper forked arms of this link, by means of tenoned screws 84, are pivotally connected to a slidably mounted tubular member 85 which is positioned so that its longitudinal axis is in the turning axis of the dial housing 50 and the connecting rod 33 passes therethrough. This tubular member is guided by an opening in a flange 86 of the cap 52 (Figs. II, III, IV) and an aligned opening in a bracket 87 secured, by means of bolts 88, to an integral bracket 89 of the dial housing 50 to which the lower end of the pendulum frame 39 is bolted. The upper end of the tubular member 85, that is that portion which extends above the bracket 87, is provided with a series of teeth 90 which are turned thereon and extend completely around this tubular member. These teeth engage teeth of a pinion 91 pinned on a shaft 92 which is mounted in suitable bearings in spaced bosses 93 extending upwardly from the bracket 87. The shaft 92 extends forwardly and, by means of a hub 94, supports a flash or disk 95 upon which a plurality of sets of weight indicating numerals 96 are printed or otherwise marked. Since this disk is positioned directly behind the chart 48, an opening 97 therein is adapted to expose one of these sets of numerals. These numerals represent the weight of the amount of load offset by the unit weights which are resting on the member 59. Since the tubular member 85 is positioned directly in the turning axis of the housing and the pinion 91 describes a concentric path when the housing 50 is being turned the teeth on the tubular member remain in engagement with the teeth of the pinion 91 so that regardless of the angular position of the dial housing 50 movement of the unit weight actuating handle 79 is adapted to raise or lower the tubular rack member, through the yoke-like link, and in cooperation with the pinion 91 turn the flash 95 so that the proper set of numerals 96 is exposed.

If, for example, it is desired to change the position of the dial housing 50 from the one shown in Fig. II to that shown in Fig. I the bolts 57 are loosened. This releases the locking ring 58 and the cap 52 to which this housing is fastened may now be turned about its axis. Displacement is prevented by the circular aperture formed by the flange 54' in the cabinet cover into which the rim 54 projects. When the desired position of the dial housing 50 has been established, the bolts 57 are tightened, this draws the locking ring 58 into clamping engagement with the flange 54' and the housing is again securely held against accidental rotation. Since the connecting rod 33 is positioned in the turning axis of this dial housing and this connecting rod is mounted so that it may rotate freely in the equalizer 34 the thrust ball bearing 55, on which the locked nuts 56 are resting, the connection between the pendulum lever 25 and the pendulums will not be twisted so as to interfere with the proper operation of the load counterbalancing mechanism and the automatic weight indicating means.

Having described the invention, I claim:

1. In a device of the class described, in combination, a cabinet, a housing rotatably mounted thereon, a lever in said cabinet, auxiliary load counterbalancing mechanism operatively connected to said lever, a handle operatively connected to said auxiliary load counterbalancing mechanism, automatic load counterbalancing mechanism mounted within said housing, means controlled by said automatic load counterbalancing mechanism for indicating weights of loads offset by said automatic load counterbalancing mechanism, auxiliary indicating means in said housing controlled by and for indicating weights of loads offset by said auxiliary load counterbalancing mechanism, swivelable means operatively connecting said lever and said automatic load counterbalancing mechanism in said rotatable housing, and swivelable drivingly connected means for actuating said auxiliary indicating means, the longitudinal axes of said swivelable means operatively connecting said lever and said automatic load counterbalancing mechanism and of said means for actuating said auxiliary indicating means being in coincidence and in coincidence with the axis of rotation of said housing on said cabinet.

2. In a device of the class described, in combination, a cabinet, a housing rotatably mounted thereon, a lever in said cabinet, auxiliary load counterbalancing mechanism operatively connected to said lever, a handle operatively connected to said auxiliary load counterbalancing mechanism, automatic load counterbalancing mechanism mounted within said housing, means controlled by said automatic load counterbalancing mechanism for indicating weights of loads offset by said automatic load counterbalancing mechanism, auxiliary indicating means in said housing controlled by and for indicating weights of loads offset by said auxiliary load counterbalancing mechanism, swivelable means operatively connecting said lever and said automatic load counterbalancing mechanism in said rotatable housing, and swivelable drivingly connected means for actuating said auxiliary indicating means, the longitudinal axes of said swivelable means operatively connecting said lever and said automatic load counterbalancing mechanism and of said means for actuating said auxiliary indicating means being in coincidence and in coincidence with the axis of rotation of said housing on said cabinet, said swivelable drivingly connected means comprising a tubular member and said swivelable means for operatively connecting said lever and said load counterbalancing mechanism including a rod positioned to extend through the interior of said tubular member.

3. In a device of the class described, in combination, a cabinet, a dial housing rotatably mounted upon said cabinet, mechanism mounted within said dial housing and adapted to partake of the rotation of said housing, cooperating mechanism mounted within said cabinet, a plurality of means for connecting said mechanism in said cabinet to said mechanism in said dial housing, one of said means comprising a tubular member pivotally engaged with said mechanism within said cabinet and drivingly and swivelingly connected to said mechanism within said housing, said tubular member having reciprocating motion and being positioned in coincidence with the axis of rotation of said dial housing, the other of said plurality of connecting means comprising a rod pivotally engaging said mechanism mounted within said cabinet, extending through said tubular member and swivelingly engaging said mechanism within said dial housing whereby said dial housing may be rotated upon said cabinet without reactively influencing said mechanisms.

4. In a device of the class described, a cabinet, a dial housing swivelably mounted upon said cabinet, a pendulum load counterbalancing mechanism mounted within said dial housing for counterbalancing a portion of the load, means for actuating said pendulum load counterbalancing mechanism including a lever pivoted within said cabinet and a rod-like member pivotally engaging the free end of said lever and swivelably connected to said pendulum load counterbalancing mechanism whereby said rod-like member is adapted to describe an arcuate path when actuating said pendulum load counterbalancing mechanism, auxiliary load counterbalancing mechanism stationed within said cabinet for counterbalancing the remainder of such load, rotatable means in said housing for indicating the amount counterbalanced by said auxiliary load counterbalancing mechanism, means for actuating said auxiliary load counterbalancing mechanism including a pivoted manually actuated lever, means for connecting said auxiliary load counterbalancing mechanism to said rotatable means for indicating the amount of load counterbalanced by said auxiliary load counterbalancing mechanism, said connecting means comprising a tubular rack, a pinion engaged in said rack and drivingly connected to said rotatable indicating means, and a link pivotally connecting said tubular rack and said manually actuated lever, and means for guiding said tubular rack for movement in a vertical path, the longitudinal axes of said rod-like member and of said tubular rack being substantially in coincidence and in coincidence with the axis of rotation of said dial housing, and the internal diameter of said tubular rack being such that said rod-like member for actuating said load counterbalancing pendulums may describe an arcuate path while passing freely therethrough.

5. In a device of the class described, in combination, automatic load counterbalancing mechanism for offsetting a part of the load, auxiliary load counterbalancing mechanism for offsetting the remainder of the load, indicating means for indicating the amount of load offset by said automatic load counterbalancing mechanism comprising a chart and an indicator actuated by said automatic load counterbalancing mechanism, a rotatable indicia-bearing disk for indicating the amount of load offset by said auxiliary load counterbalancing mechanism, said indicating means and said rotatable disk being both swivelable to afford an indication of the total load from any one of a plurality of directions, means for actuating said automatic load counterbalancing mechanism including a rod-like member swivelably connected to said automatic load counterbalancing mechanism, a tubular rack, and a pinion engaged therein for operatively connecting said auxiliary load counterbalancing mechanism to said rotatable disk, said rod-like member passing through said tubular rack, the longitudinal axes of said rod-like member and said tubular rack being substantially in coincidence and the internal diameter of said tubular rack being such that said rod-like member passes freely therethrough.

6. In a weighing scale, in combination, a cabinet, a dial housing swivelingly mounted on said cabinet, automatic load counterbalancing mechanism located in said housing, an indicia-bearing dial located in said housing, an indicator drivingly connected to said automatic load counterbalancing mechanism for cooperating with said dial to indicate residual portions of loads weighed on said scale, a lever mounted in said cabinet, auxiliary load counterbalancing mechanism operatively connected to said lever, manually operable means for increasing the load counterbalancing ability of said auxiliary load counterbalancing mechanism in fixed amounts, a swivelable connecting rod pivotally connected to said automatic load counterbalancing mechanism and to said lever, a tubular member pivotally connected to said manually operable means and auxiliary indicating means mounted in said housing for indicating the fixed amounts of load counterbalanced by said auxiliary load counterbalancing mechanism, said auxiliary indicating means being drivingly and swivelingly connected to said tubular member, the axes of said connecting rod and said tubular member both being substantially coincident with the axis of said housing.

HALVOR O. HEM.